(12) United States Patent
Pfeiffer et al.

(10) Patent No.: US 6,682,290 B2
(45) Date of Patent: Jan. 27, 2004

(54) SYSTEM FOR HANDLING BULK PARTICULATE MATERIALS

(75) Inventors: John W. Pfeiffer, Hughesville, PA (US); James E. Mothersbaugh, Muncy, PA (US)

(73) Assignee: The Young Industries, Inc., Muncy, PA (US)

(*) Notice: Subject to any disclaimer, the term of this patent is extended or adjusted under 35 U.S.C. 154(b) by 0 days.

(21) Appl. No.: 10/424,780

(22) Filed: Apr. 29, 2003

(65) Prior Publication Data

US 2003/0194301 A1 Oct. 16, 2003

Related U.S. Application Data

(62) Division of application No. 09/883,486, filed on Jun. 18, 2001, now Pat. No. 6,609,871.

(51) Int. Cl.[7] ............................................. B65G 65/00
(52) U.S. Cl. ................................................. 414/328
(58) Field of Search ............................ 406/46, 89, 90, 406/91, 93, 94, 95, 138; 414/328, 397

(56) References Cited

U.S. PATENT DOCUMENTS

| 1,553,476 | A | * | 9/1925 | Schuster ........................ 366/5 |
| 3,040,760 | A | * | 6/1962 | Macks .......................... 137/13 |
| 3,253,865 | A | * | 5/1966 | Kanics .......................... 406/86 |
| 3,604,758 | A | * | 9/1971 | Flain et al. .................... 406/50 |
| 3,708,207 | A | * | 1/1973 | Steele .......................... 406/93 |
| 4,116,491 | A | * | 9/1978 | Ply ............................. 406/89 |
| 4,183,702 | A | * | 1/1980 | Bonnel ......................... 406/56 |
| 4,220,426 | A | * | 9/1980 | Ply ............................. 406/89 |
| 4,775,267 | A | * | 10/1988 | Yamamoto ................... 406/50 |
| 4,830,545 | A | * | 5/1989 | Salter et al. ................... 406/12 |
| 5,722,802 | A | * | 3/1998 | March .......................... 406/46 |
| 6,227,768 | B1 | * | 5/2001 | Higuchi et al. ............... 406/89 |

* cited by examiner

Primary Examiner—Joseph A. Dillon
(74) Attorney, Agent, or Firm—Stevens, Davis, Miller & Mosher, LLP

(57) ABSTRACT

A system for handling a bulk particulate material generally consisting of a vessel for holding a mass of such material; a first elongated tube formed of a gas permeable material, having an inlet communicating with such vessel; a second elongated tube formed of a gas impervious material encompassing the first tube and spaced therefrom about the periphery of the first tube; a plurality of transversely disposed, longitudinally spaced partitions disposed between said first and second tubes, forming a plurality of isolated chambers encompassing the first tube; each of such isolated chambers having means for selectively introducing a fluidizing gas therein independently of the other of such chambers, at variable volumes and pressures whereby the volume and pressure of fluidizing gas diffused through the first tube may be modulated along the length thereof; and means for injecting a flow inducing gas into the first tube.

18 Claims, 3 Drawing Sheets

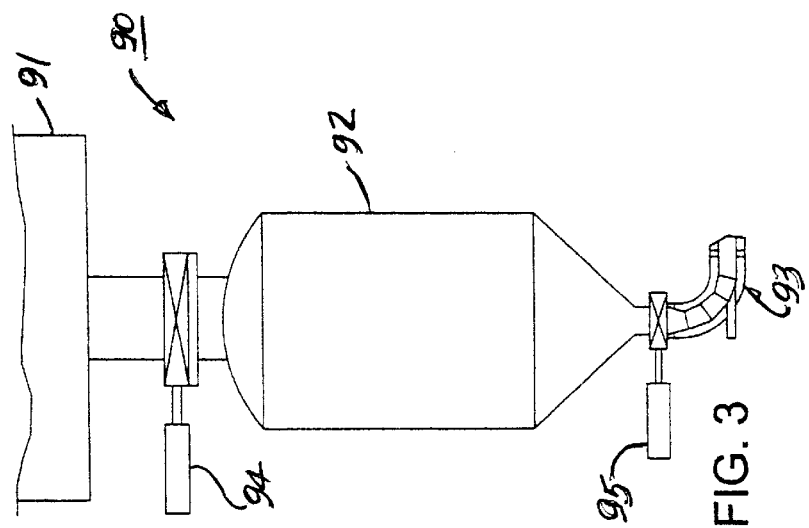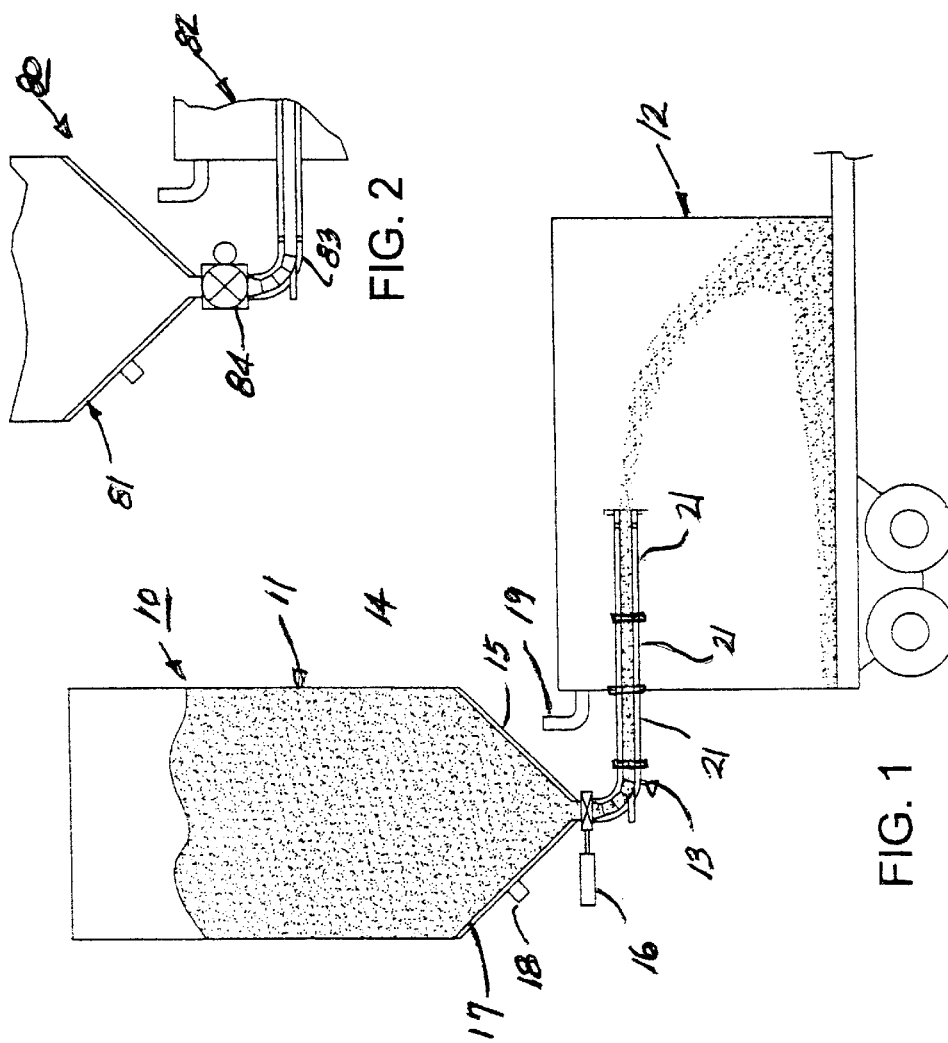

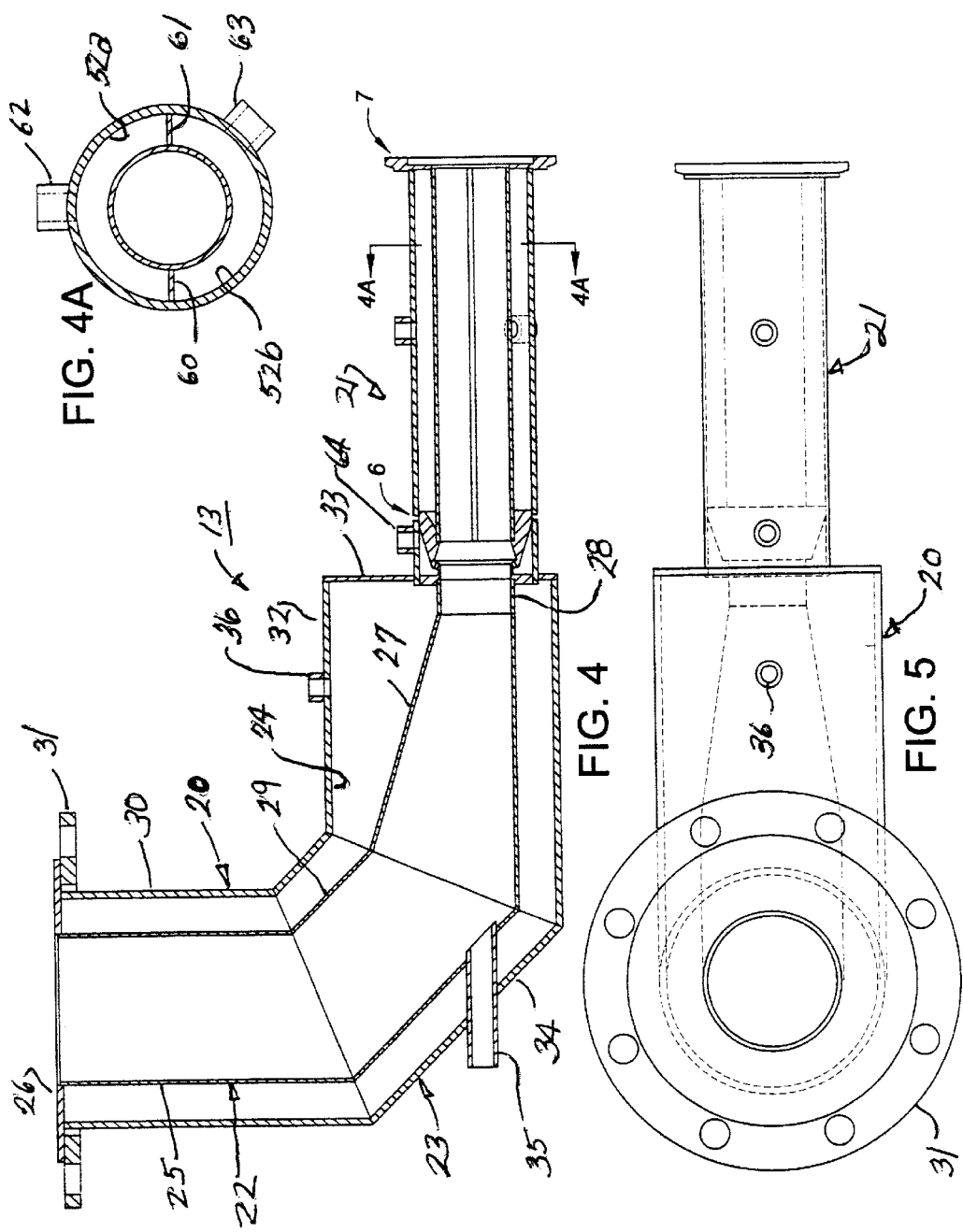

SYSTEM FOR HANDLING BULK PARTICULATE MATERIALS

This application is a divisional application of U.S. application, Ser. No. 09/883,486 filed Jun. 18, 2001 now U.S. Pat. No. 6,609,871.

This invention relates to a system for handling bulk particulate material, including a transport line for pneumatically conveying such material.

BACKGROUND OF THE INVENTION

In the chemical, food processing and pharmaceutical industries, gas fluidizing conveyors typically are used for conveying powder and fine granular bulk materials. Such conveyors generally consist of a lower trough into which fluidizing gas is introduced, a gas permeable membrane sealed against the upper side of the lower trough and an upper cover to enclose and channel the flowing fluidized material and to prevent the escape of airborne dust into a plant environment except at the end of the conveyor. Typically, such conveyors are installed at a downwardly inclined angle between the inlet and the outlet to facilitate the flow of the fluidized material under the force of gravity. In operation, the fluidized material forms a continuous flowing mass which flows freely to the lower end of the inclined conveyor. The discharge rate and velocity of the material flow of such conveyors may be controlled by varying the angle of incline of the conveyor and by modulating the fluidizing gas flow entering the lower trough and subsequently passing upwardly through the gas permeable membrane. Such conveyors generally are employed beneath silos equipped with vibratory or fluidizing type discharges, but operate substantially independent of the silo discharge system. This type of conveyor does not depend upon silo discharge pressure for its operation and its discharge opening normally is not 100 percent full of material over its opening cross section. Fluidizing conveyors of the type described are limited in application only to materials which are readily fluidizeable and not to more coarse materials which would require large volumes of air or gas for fluidization. Because of such limitations, it is desirable to provide a material handling system including means for pneumatically conveying bulk particulate materials which is capable of conveying particulate materials of a broader range of sizes with the use of less gas as a conveying medium and without the need to incline the conveyor to provide gravity flow.

Accordingly, it is the principal object of the present invention to provide an improved material handling system including means for pneumatically conveying bulk particulate materials of a broader range of sizes than comparable prior art systems, controlling the flow rate of material being conveyed, utilizing less gas as a conveying medium and not requiring any particular orientation of the direction of flow of the material.

SUMMARY OF THE INVENTION

The present invention provides an improved system for handling bulk particulate material generally comprising a vessel for holding a supply of such bulk particulate material, a container into which such material is to be transported and a transport line for pneumatically conveying such material from such vessel to the container. The transport line includes a first elongated tube formed of a gas permeable material having an inlet communicating with the vessel; a second elongated tube formed of a gas impervious material encompassing the first tube and spaced therefrom about the periphery of the first tube; a plurality of transversely disposed partitions disposed between the first and second tubes, spaced along the lengths thereof, forming a plurality of chambers encompassing the first tube; each of the chambers having means for selectively introducing a fluidizing gas independently of the other chambers at variable volumes and pressures whereby the volume and pressure of fluidizing gas defused through the first tube may be modulated along the length thereof; and means for injecting a flow inducing gas into the first tube. Preferably, the transport line consists of a plurality of sections which may be joined together in end-to-end relation, in various lengths, orientations and configurations, and further means are provided for injecting a flow enhancing gas at spaced intervals along such transport line.

BRIEF DESCRIPTION OF THE DRAWINGS

FIG. 1 is a side elevational view of a system for handling a bulk particulate material embodying the present invention;

FIG. 2 is a view similar to the view shown in FIG. 1, illustrating another system for handling bulk particulate materials, incorporating another embodiment of the present invention, having portions thereof broken away;

FIG. 3 is a view similar to the view shown in FIG. 1, illustrating another system for handling a bulk particulate material, incorporating a further embodiment of the present invention, having portions thereof broken away;

FIG. 4 is an enlarged, vertical cross sectional view of a segment of the transport line utilized in each of the systems shown in FIGS. 1 through 3;

FIG. 4A is a cross sectional view taken along line 4A—4A in FIG. 4;

FIG. 5 is a top view of the line segment shown in FIG. 4;

DESCRIPTION OF THE PREFERRED EMBODIMENTS OF THE INVENTION

Figure 7:
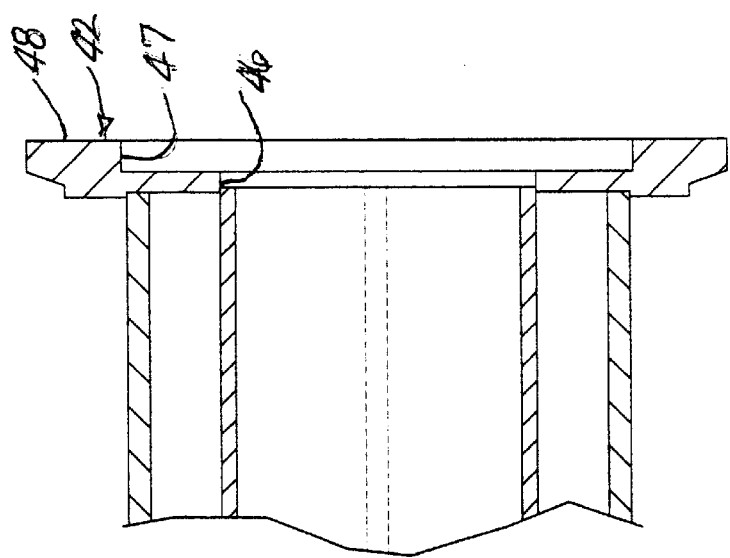
FIG. 7 is an opposite end view of the section shown in FIG. 6.

Referring to FIGS. 1 and 4 through 7 of the drawings, there is illustrated a system 10 for handling a bulk particulate material, embodying the present invention, which includes a vessel 11, a container 12 and a transport line 13 for pneumatically conveying a bulk particulate material contained in the vessel to the interior of container 12. Vessel 11 includes a cylindrical side wall 14 open to the atmosphere at the upper end thereof and a conically configured bottom wall 15 having an outlet provided with a shut-off valve 16. With vessel 10 open to the atmosphere, material contained with the vessel is adapted to gravity flow into transport line 13 upon opening valve 16. The discharge flow of material in vessel 11 is enhanced by fluidizing the inner side of the lower conical section of the vessel. Such fluidization is provided by a gas permeable, conically configured liner 17 positioned adjacent the inner side of the conical section of the vessel and a gas inlet 18 which may be connected to a source of a gas, usually air, under pressure for supplying gas under pressure to the conical section of the vessel which permeates through liner 17 to fluidize and thereby enhance the flow of material in the conical section of the vessel.

Container 12 may be of any suitable type and size and may be stationary or transportable on the flatbed of a truck as shown, a rail car, a watercraft or an aircraft or may consist of an integral component of such modes of transportation. The container typically is provided with an opening in a wall thereof through which the free end of the transport line 13 may be inserted, and an exhaust 19 through which air injected into the container may be vented. Because air vented through the exhaust will contain entrained airborne particles from the material injected into the container, exhaust 19 typically would be connected to a dust collector to capture such particles. Preferably, the interior of container 12 is provided with a liner into which the material injected by the transport line is loaded, having a first closeable opening for receiving the free end of the transport line therethrough and a second closeable opening for the exhaust. It further is contemplated that the container and correspondingly any liner within the container will be provided with an outlet opening through which material in the container may be discharged. Such material may be discharged simply by tilting the container and allowing the material within the container to gravity flow out of the container or a pneumatic conveying line may be connected to such discharge outlet.

Transport line 13 preferably consists of a transition section 20 and a plurality of linear sections 21. The linear sections may be secured together in end-to-end relation to any length desired, with the initial of such sections secured to the transition section. The transport line may be simply secured to the underside of the storage vessel and project in a cantilevered manner as shown in FIG. 1 or further supported along its length as may be required.

Transition section 20 includes an inner tube 22 formed of a gas permeable material and an outer tube 23 formed of gas impervious material to provide a chamber 24 therebetween. Inner tube 22 further consists of a vertical tube segment 25 provided with a peripheral flange 26 at an upper end thereof, a substantially horizontal tube segment 27 terminating in an outlet portion 28 and an interconnecting section 29 interconnecting vertical and horizontal segments 25 and 27. Similarly, outer tube 23 includes a vertical tube segment 30 encompassing inner tube segment 25 and provided with a peripheral flange 31 at an upper end thereof which is adapted to be secured to the outlet of the vessel, a horizontal tube segment 32 encompassing inner tube segment 27 and having an end wall 33 and a tube segment 34 interconnecting tube segments 30 and 32 and encompassing inner tube segment 29. As best shown in FIG. 4, section 20 is provided with a nozzle 35 extending through outer and inner tube sections 29 and 34 and communicating with the interior of inner tube 22. Nozzle 35 is intended to be connected to a source of gas under high pressure for injecting a supply of flow inducing gas into the transport line through transition section 20. The flow inducing air thus injected into the transport line may be ordinary air, another gas of a special composition, an inert gas or a treated gas such as dehumidified air. The type of gas used would depend upon the nature of the material being conveyed. Outer tube 32 further is provided with an inlet 36 which communicates with chamber 24. Inlet 36 is intended to be connected to a source of fluidizing gas under pressure. Such fluidizing gas also may consist of ordinary air, another gas of special composition, an inert gas or a treated gas. It further would be supplied at a comparatively low pressure to pressurize chamber 24 and thus cause such gas to diffuse through the permeable material of the inner tube to fluidize particulate materials introduced into the transition section of the line.

Figure 6:
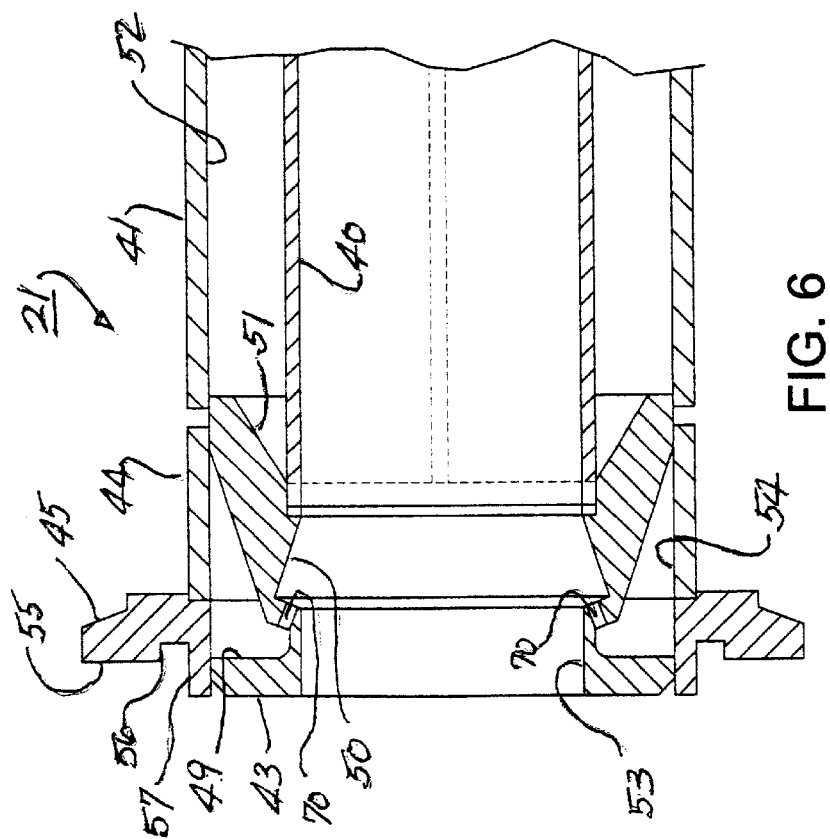
FIG. 6 is an enlarged cross sectional view of an end portion of one of the linear sections shown in FIGS. 1 through 5.

Each of linear sections 21 is constructed as shown in FIGS. 6 and 7 except for the section attached to the transition section which is modified slightly at the end in which it joins the transition section. Referring to FIGS. 6 and 7, each section 21 with the exception of the section joining the transition section includes an inner tube 40 formed of a gas permeable material, an outer tube 41 formed of a gas impervious material encompassing the inner tube, a pair of end walls 42 and 43, a tube portion 44 forming a continuation of outer tube 41 and a flange 45. End wall 42 is adapted to be secured preferably by welding to one set of ends of inner and outer tubes 40 and 41 and is provided with an opening 46 communicating with the interior of the inner tube. Such opening further is provided with an enlarged section 47. The end wall also is provided with a peripheral mating surface 48. End wall 43 is provided with a peripheral recess 49 in an outer side thereof and a peripheral recess 50 on an inner side thereof providing a segment 51 which is secured to the other set of ends of inner and outer tubes 40 and 41, preferably by welding and cooperates with such tubes and a portion of end wall 42 to define a chamber 52 encompassing inner tube 40. End wall 43 further is provided with an opening 53 communicating with the interior of inner tube 40.

Tube portion 44 is adapted to be aligned with outer tube 41 and secured to end wall segment 51 and an end of outer tube 41. Flange 45 further is mounted in alignment with the outer tube and is secured to an outer edge of end wall 43 and tube portion 44 to close recess 49 in end wall 43 and thus form a chamber 54.

The end face of flange 45 is recessed so as to provide a peripheral surface 55, a peripheral recess 56 in surface 55 and a peripheral portion 57 disposed substantially in alignment with outer tube 41 and tube portion 44. Flange 45 is adapted to be mated with an end wall 42 of an adjoining section 21 and secured together to form transport line 13. When such two adjoining sections are mated together, peripheral section 57 of one section is adapted to be received in enlarged opening 47 of the other section, mating surface 53 of such one section is adapted to engage a mating section 48 of such other section and recess 56 of such one section is adapted to cooperate with mating section 48 to provide a peripheral opening to accommodate a sealing ring. The mating end walls of adjoining sections further may be joined together by any suitable means including coupling clamps, welding and bolting.

As best shown in FIGS. 4 and 4A, each section 21 is provided with a pair of transversely disposed, longitudinally extending partitions 60 and 61 interconnecting the inner and outer tubes 40 and 41 to provide a pair of subchambers 52a and 52b. Each section further is provided with a first inlet 62 communicating with subchamber 52a, an inlet 63 communicating with subchamber 52b and an inlet 64 communicating with chamber 54. Inlets 62 and 63 are adapted to be connected to a single or separate sources of fluidizing gas under pressure, and inlet 64 is intended to be connected to a source of a flow enhancing gas under pressure which may consist of the same source supplying flow inducing gas to nozzle 35 or a separate source. As in the flow inducing gas injected through nozzle 35, fluidizing gas introduced through inlets 62 and 63 and flow inducing gas injected through inlet 64 may consist of ordinary air, another gas of a special composition, an inert gas or a treated gas.

Portion 51 of end wall 43 functions to bridge the main portion of end wall 43 with an end of inner tube 40, cooperate in forming chambers 52 and 54 and act as a partition between chambers 52 and 53. It further is provided with a plurality of peripherally spaced fluid passageways 70 each lying in a conical plane, interconnecting chamber 54 with the interior of inner tube 40. Flow enhancing gas introduced into chamber 54 will be caused to flow at an accelerated velocity through passageways 70 to enhance the flow of particulate material through inner tube 40 initially having been impelled by flow inducing gas injected through nozzle 35.

Chambers 52 of sections 21 secured in end to end relation to form transport line 13 are isolated from each other so that fluidizing gas pressure and volume can be selectively modulated to vary the discharge velocity and degree of fluidization of the material being conveyed. In installations provided with subchambers 52a and 52b as described, chambers 52b may be provided with a gas for control of fluidization while upper chambers 52a may be provided with a gas to control discharge velocity. The volume of flow enhancing gas injected into chambers 54 further may be modulated to control the flow of particulate material in the inner tube of the transport line.

System 80 shown in FIG. 2 is similar in construction and operation to system 10 and includes a vessel 81, a container 82, a transport line 83 and a rotary valve 84 adapted to receive fluidize material from vessel 81 and discharge such material into transport line 83. Transport line 83 is similar in construction and operation to transport line 13. System 90 shown in FIG. 3 also is similar in construction and operation to system 10. It includes an intermediate bulk material container 91, a pressurized vessel 92 and a transport line 93 having a free end projecting into a container to be loaded. A shut-off valve 94 is provided between container 91 and pressurized vessel 92 and a similar shut-off valve 95 is provided between pressure vessel 92 and transport line 93. Here again, transport line 93 is similar in construction and operation to transport line 13 described in connection with the system shown in FIGS. 1 and 4 through 7.

Sections 20 and 21 of the transport line may be provided with any suitable cross sectional configuration including circular, elliptical and polygonal cross-sectional configuration. The components of such sections may be formed of a metal including steel and aluminum and a suitable plastic or composite material. The tubular sections may be formed of stock materials such as piping and the like and the end walls and flanges may be formed of tubular material or cast and possibly machined. In manufacturing a section as shown in FIGS. 6 and 7, tubes 40 and 41 and tube portion 44 may be cut to size from tubular stock material, end walls 42 and 43 and flange 45 may be formed by first casting and then machining, end walls 42 and 43 may be secured to inner and outer tubes 40 and 41 by welding and then tube portion 44 and flange 45 may be installed on end wall 43 by welding.

As previously mentioned, one end of a section 21 connected to transition section 20 would be modified as shown in FIG. 4 by omitting a flange 45, extending the length of tube portion 44, securing the end of tube portion 44 to end wall 33 of the transition section and securing the main body portion of end wall 43 to outlet portion 28 of inner tube 22 of the transition section which is adapted to be received within opening 53 of end wall 43, preferably by welding.

Although the sections of the transport line, with the exception of the transition section 20, have been described as linear in configuration, it is within the contemplated scope of the invention to also provide sections having angularly offset segments. Such sections may be utilized at the discharge end of the line to direct the discharge flow of material in a downward or another direction, as desired, or to alter the direction of flow of material being conveyed. In such sections altering the direction of flow, they may be provided with nozzles comparable to nozzle 35 aligned with the offset section, through which a high pressure, flow inducing or enhancing gas may be injected.

Generally, the fluidizing gas introduced into the encompassing chambers and permeating the inner tube is of a comparatively low pressure, and the flow inducing and enhancing gases injected into the inner tube are of a comparatively high velocity and pressure.

The invention as described in its various embodiments is a substantial improvement over systems employing dilute-phase and dense-phase pneumatic conveying due to the much higher solids:gas ratio possible. Solid:gas ratio for the invention as described when handling fluidizable material is over 30 pounds of solids per pound of gas. In comparison, dilute-phase conveying systems require dilution of the conveyed material to less than 15 pounds of solids per pound of gas. This aspect of the invention is significant in that conveying gas must be vented from containers being filled, and, in general, lesser amounts of vented gas are preferred. Smaller quantities of vented gas result in less gas waste if the conveying gas is a cost factor due to a special composition of the gas or a special treatment of the gas. Smaller quantities of vented gas also result in less product loss as gas exchange rates and velocities are reduced thus allowing more time for airborne dust to settle within the receiving container. Also, significant reduction in dust collection system capacity is possible and the much reduce conveying air volume makes pressure damage to the receiving container or its lining much less likely than with conventional pneumatic conveying systems.

The invention as described has additional advantages over the prior art in that it has no moving parts and can easily be fabricated with a smoothly contoured outlet end thus reducing the risk of damage to the lining to a container, is quiet and nearly free of vibration in operation compared to other pneumatic and mechanical conveying systems and can easily be made entirely from heat-resisting materials which is not practical with some mechanical type conveying systems. Furthermore, the conveying rate of the material can be controlled by adjusting the fluidizing air flow, and conveying can be stopped and started instantaneously without plugging and without the need to purge the conveying tube.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A system for handling bulk particulate material comprising:
   means for holding a mass of said bulk particulate material;
   a first elongated tube formed of a gas permeable material, having an inlet communicating with said holding means;
   a second elongated tube formed of a gas impervious material encompassing said tube and spaced therefrom about the periphery thereof;
   a plurality of transversely disposed, longitudinally spaced partitions disposed between said first and second tubes, forming a plurality of isolated chambers encompassing said first tube;
   each of said chambers having means for selectively introducing a fluidizing gas independently of the other of said chambers, at variable volumes and pressures whereby the volume and pressure of fluidizing gas diffused through said first tube may be modulated along the length thereof;

means for injecting a flow inducing gas into said first tube; and wherein said holding means includes an open storage vessel, a pressurized vessel, a first valve disposed between said vessels and a second valve disposed between said second vessel and said first tube.

2. A system according to claim 1 including a container having a closeable inlet through which a free end of said first tube may be inserted to discharge bulk particulate material conveyed therethrough, and an exhaust connectable to a dust collection system.

3. A system according to claim 1 wherein said container is provided with a liner therein which said bulk particulate material may be deposited.

4. A system according to claim 1 wherein a material transporting line including said first and second tubes and said partitions includes a plurality of sections connected together in end-to-end relation, and wherein each of said sections comprises:

an inner tube formed of a gas permeable material and provided with a pair of end walls, each connectable to a similar end wall of a similar section;

an outer tube formed of a gas impervious material disposed between said end walls and cooperating with said inner tube and said flanges to define a chamber encompassing said inner tube; and said chamber having means for selectively introducing a fluidizing gas therein at variable volumes and pressures, independently.

5. A system according to claim 4 wherein said section includes means for injecting a flow enhancing gas into said inner tube.

6. A system according to claim 5 wherein said means for injecting the flow enhancing gas into said inner tube injects said flow enhancing gas substantially in a direction of flow of said flow inducing gas.

7. A system according to claim 4 including a pair of longitudinally disposed partitions disposed between said inner and outer tubes and wherein each of said chambers thus formed is provided with means for selectively introducing a fluidizing gas therein, independently.

8. A system according to claim 4 including a laterally disposed partition between an end of said inner tube and an adjacent end wall, between said inner and outer tubes and between said adjacent end wall and said outer tube, forming a second chamber disposed between said adjacent flange and said partition encompassing said inner tube and a second chamber disposed between said partition and the other of said end walls wherein said partition includes at least one fluid passageway intercommunicating said second chamber and the interior of said inner tube and said means for selectively introducing a fluidizing gas at variable volumes and pressures functions to introduce said fluidizing gas into said first chamber, and including means for selectively injecting a flow enhancing gas into said second chamber.

9. A system according to claim 8 wherein said fluid passageway functions to inject said flow enhancing gas substantially in a dire,on of flow of said flow inducing gas.

10. A system according to claim 8 including a plurality of said fluid passageways circumferentially spaced relative to a longitudinal axis of said inner tube.

11. A system according to claim 10 wherein said fluid passageways lie in a frusto-conical plane substantially directed toward the direction of flow of said inducing gas.

12. A system according to claim 1 wherein said inducing and fluidizing gases comprise air.

13. A system according to claim 1 wherein said inducing and fluidizing gases comprise an inert gas.

14. A system according to claim 1 wherein said inducing and fluidizing gases are a treated gas.

15. A system according to claim 14 wherein said gas is dehumidified.

16. A system according to claim 1 wherein said inducing and fluidizing gases are a gas compatible with the composition of said bulk particulate material.

17. A system for handling bulk particulate material comprising:

means for holding a mass of said bulk particulate material;

a first elongated tube formed of a gas permeable material, having an inlet communicating with said holding means;

a second elongated tube formed of a gas impervious material encompassing said tube and spaced therefrom about the periphery thereof;

a plurality of transversely disposed, longitudinally spaced partitions disposed between said first and second tubes, forming a plurality of isolated chambers encompassing said first tube;

each of said chambers having means for selectively introducing a fluidizing gas independently of the other of said chambers, at variable volumes and pressures whereby the volume and pressure of fluidizing gas diffused through said first tube may be modulated along the length thereof;

means for injecting a flow inducing gas into said first tube; and wherein said holding means includes a storage vessel and a metering device disposed between said vessel and said first tube.

18. A system according to claim 17 wherein said metering device comprises a rotary valve.

* * * * *